United States Patent
Shelley et al.

(10) Patent No.: US 8,053,085 B2
(45) Date of Patent: Nov. 8, 2011

(54) HEAT-SHRINKABLE FILM

(75) Inventors: Christopher Shelley, Lebanon, OH (US); Matthew A. Sonnycalb, Lebanon, OH (US)

(73) Assignee: Equistar Chemicals, LP, Houston, TX (US)

( * ) Notice: Subject to any disclaimer, the term of this patent is extended or adjusted under 35 U.S.C. 154(b) by 115 days.

(21) Appl. No.: 12/456,403

(22) Filed: Jun. 16, 2009

(65) Prior Publication Data

US 2010/0316869 A1 Dec. 16, 2010

(51) Int. Cl.
*B32B 5/16* (2006.01)

(52) U.S. Cl. ........................ 428/515; 428/500

(58) Field of Classification Search .............. None
See application file for complete search history.

(56) References Cited

U.S. PATENT DOCUMENTS

| | | | |
|---|---|---|---|
| 4,126,262 A * | 11/1978 | Thompson et al. | 229/190 |
| 4,464,518 A | 8/1984 | Iwabuchi et al. | |
| 5,534,472 A | 7/1996 | Winslow et al. | |
| 6,171,993 B1 | 1/2001 | Mavridis et al. | |
| 6,187,397 B1 | 2/2001 | Grangette | |
| 6,306,969 B1 | 10/2001 | Patel et al. | |
| 6,638,545 B1 | 10/2003 | Rombi | |
| 6,713,585 B1 | 3/2004 | Mavridis et al. | |
| 7,230,054 B2 | 6/2007 | Mavridis et al. | |
| 7,407,591 B2 | 8/2008 | De Battisti et al. | |
| 7,439,306 B2 | 10/2008 | Davis | |
| 2005/0064218 A1 | 3/2005 | Davis et al. | |
| 2006/0057410 A1* | 3/2006 | Saavedra et al. | 428/515 |
| 2006/0286321 A1* | 12/2006 | Broadus et al. | 428/35.7 |

OTHER PUBLICATIONS

R. Shroff and H. Mavridis, "New Measures of Polydispersity from Rheological Data on Polymer Melts," *J. Appl. Polym. Sci.* 57 (1995), 1605-1626.

* cited by examiner

*Primary Examiner* — Sheeba Ahmed

(57) ABSTRACT

A multilayer heat-shrinkable film having an uncommon but valuable combination of properties is disclosed. The film comprises a core layer of HDPE. Each skin layer comprises linear low density polyethylene (LLDPE), low density polyethylene (LDPE), or mixtures thereof. The core layer comprises greater than 80% by weight of a HDPE having an ER greater than 3.0, a $MI_2$ from 0.1 to 1.0 dg/min., and a density from 0.940 to 0.970 $g/cm^3$. The film has good shrink in the transverse direction, good appearance, and excellent stiffness.

8 Claims, No Drawings

HEAT-SHRINKABLE FILM

FIELD OF THE INVENTION

This invention relates to a multilayer heat-shrinkable film. The film has a high density polyethylene (HDPE) core layer. The HDPE is selected to provide a film with good heat-shrink properties.

BACKGROUND OF THE INVENTION

Heat-shrinkable films have a variety of uses. For example, they are often used to wrap groups of bottles, cans or cartons. Typically, films are applied at room temperature and then placed under a heat source to shrink. The shrink properties of the film including shrinkage in the transverse direction are important for these applications. Films of low density polyethylene (LDPE) are commonly used because of the excellent heat-shrink and optical properties of LDPE. However, LDPE has relatively poor strength and low modulus. To improve costs, there is an emphasis on using thinner films. As films become thinner, the detriments of LDPE become more significant. There have been different approaches to solve this problem.

One approach has been to make the film from a polymer blend. For example, U.S. Pat. No. 6,306,969 describes a film from a blend of polyethylene components that are closely matched in density and exhibit shrink in the direction of orientation. U.S. Pat. No. 7,439,306 teaches a method based upon Vicat softening points to select components to make a polyethylene blend useful for shrink films. While making a film from a blend can improve some properties, other properties are diminished.

Another approach has been to prepare multilayer films. For example, U.S. Pat. No. 6,368,545 teaches that core layers may be used to provide strength, impact resistance, and other properties to a film and teaches that haze can be lowered by extruding the core layer at a temperature at least 30° C. higher than the skin layers. There is no discussion of shrink. U.S. Pat. No. 6,187,397 teaches heat-shrinkable polyethylene film. In the background discussion, they teach that films have been obtained by coextrusion of three layers, more specifically a central layer of LDPE sandwiched between two linear low density polyethylene layers. They state that the central layer may include HDPE to impart stiffness, but generally the central layer comprises more than 50% by weight of LDPE. U.S. Pat. Appl. Publ. No. 2005/0064218 discloses a multilayer film containing metallocene-rich skin layers and a core containing 1-50% by weight HDPE. They state that the HDPE may be prepared by any process and Ziegler-Natta prepared HDPE is preferred. No shrink values are given. U.S. Pat. No. 7,442,786 teaches a film structure containing at least two layers, a metallocene polyethylene layer and a layer comprising from 99 to 50% by weight LDPE and 1 to 50% by weight HDPE. They state that the HDPE may be prepared by any process and Ziegler-Natta prepared HDPE is preferred. No shrink values are given.

LDPE films with good shrink properties are known, and it is known to make multilayer films and that HDPE can be used to improve the stiffness. Apparently, heat-shrinkable films with good stiffness that have good shrink properties in the transverse direction are not known.

SUMMARY OF THE INVENTION

The invention is a multilayer heat-shrinkable film comprising a core layer and two skin layers. Each skin layer comprises linear low density polyethylene (LLDPE), low density polyethylene (LDPE), or mixtures thereof. The core layer comprises at least 80% by weight of a high density polyethylene (HDPE) having an ER greater than 3.0, a melt index ($MI_2$) from 0.1 to 1.0 dg/min., and a density from 0.940 to 0.970 g/cm$^3$. The film exhibits excellent shrink properties in the transverse direction.

DETAILED DESCRIPTION OF THE INVENTION

The invention is a multilayer film with excellent heat-shrink properties in the transverse direction. The film comprises a core layer and two skin layers. The core layer comprises at least 80% by weight of a high density polyethylene (HDPE). The HDPE has an ER greater than 3.0, preferably, greater than 3.5. ER, also known as melt elasticity, is a measure of rheological polydispersity and is determined from plots of storage modulus (G') versus loss modulus (G"). ER is a measure of high-molecular-weight-end polydispersity. ER is conveniently determined as discussed in R. Shroff and H. Mavridis, *New Measures of Polydispersity from Rheological Data on Polymer Melts, J. Appl. Polym. Sci.* 57 (1995) 1605. See also U.S. Pat. Nos. 7,230,054; 6,713,585; 6,171,993; and 5,534,472, the teachings of which are incorporated herein by reference.

The HDPE can be made using a variety of catalysts, including Ziegler-Natta, chromium oxide, and metallocene or single-site catalysts and by a variety of processes such as gas-phase, slurry, and solution processes. Preferably, the catalyst is supported. One useful catalyst is described in U.S. Pat. No. 4,464,518, the teachings of which are incorporated herein by reference. Another useful catalyst is chromium oxide. This is known in the art as a Phillips catalyst. See U.S. Pat. No. 7,407,591 and references cited therein for a discussion of Phillips catalysts. A variety of reactor designs and configurations can be used. Reactors can be arranged in series or in parallel. One convenient method is the slurry loop process. In a slurry loop process, the HDPE is prepared in a reactor consisting of a pipe containing a flowing stream of reactants. In a slurry loop reactor, reactants are fed into a pipe containing a solvent and a catalyst. The admixture of solvent, reactants, and catalyst are continuously recycled through the pipe, hence the term "loop," with the HDPE being continuously removed. As those skilled in the art will appreciate, not all catalysts and process combinations will be suitable for making HDPE with an ER greater than 3.0.

The HDPE has a melt index ($MI_2$) from 0.1 to 1.0 dg/min. as measured according to ASTM D1238, Condition 190/2.16. The HDPE has a density from 0.940 to 0.970 g/cm$^3$, as measured by ASTM D1505-96.

The core layer comprises at least 80% by weight of a HDPE. The core material may be HDPE or a blend of HDPE with other materials. Preferably, the core layer is at least 95% by weight HDPE and more preferably, 100% HDPE. The HDPE improves the stiffness of the multilayer film and blending is not necessary. However, the HDPE may be blended with other materials to form a core layer comprising at least 80% by weight of HDPE. When the HDPE is blended, preferably, it is blended with other polyolefins. Preferred polyolefins are polypropylene, LDPE, linear low density polyethylene (LLDPE), medium density polyethylene (MDPE), and grafted polyolefins such as maleic anhydride-grafted polyethylene.

Each skin layer comprises LLDPE, LDPE, or mixtures thereof. The skin layers may be different from each other, but preferably, they are the same. Preferably, each skin layer comprises a metallocene-based linear low density polyethylene (m-LLDPE) or a blend of m-LLDPE and LDPE. Preferred blends comprise at least 80 wt. %, more preferably at least 90 wt. %, of m-LLDPE.

Optionally, the multilayer film may contain more than three layers. For example, the multilayer film can be a five-layer film with a core layer, two skin layers, and a layer between the core layer and each of the skin layers.

The multilayer film has an overall thickness of less than 300 microns. When thickness exceeds 300 microns, the article is generally considered to be a sheet rather than a film. Preferably, films of the invention have a thickness from 25 to 150 microns, more preferably from 30 to 80 microns. The thickness of the core layer can be varied. For some applications, especially those requiring high modulus, it is desirable to have a thick core layer. For other applications, such as those for which optical properties are important, it is desirable to have a thin core layer. Preferably, the core layer has a thickness representing from 25 to 90% of the total thickness of the film, more preferably from 60 to 85%. Preferably, the thickness of each of the skin layers will be similar to each other. For a three-layer film, preferably the skin/core/skin relative thickness ratio is from 25/50/25 to 5/90/5.

Preferably, the multilayer films are prepared by coextrusion on a blown film line. Polyethylene can be blown into films on machines operating such that the bubble is blown with a low stalk. This bubble configuration is known as in-the-pocket. By "in-the-pocket," we mean that the polymer exits the die and is held parallel to the air ring cone by venturi forces due to the rapidly moving cooling air in a way such that the bubble shape is formed shortly after it exits the die. This typically results in a bubble with a lower frost-line and typically a lower blow-up ratio than observed with the high-stalk process. The "blow-up ratio" is the ratio of the diameter of the bubble to the diameter of the die. In a high-stalk process, the polymer exits the die with an original diameter comparable to that of the die. At a point above the die, the polymer relaxes and the bubble expands to a larger diameter. A high-stalk process can also be used to blow the film. "High stalk" generally means that a relatively high blow-up ratio, usually greater than 3:1, and a relatively high frost-line height have been employed. High-stalk conditions allow less machine-direction orientation of the polymer. This increases the mechanical strength of the film. Greater dart drop impact strength is obtained when high-stalk conditions are used. When comparing film properties, it is important to compare films processed under similar conditions. Preferably, the film is blown in a low-stalk process.

The film is a heat-shrinkable film. Processing-induced orientation influences shrink and many films have good shrink in the machine direction (MD). However, a heat-shrinkable film should also have shrink in the transverse direction (TD). By "heat-shrinkable," we mean that the shrink is 5% or more in the transverse direction when measured at 135° C. according to ASTM D2732. Preferably, the TD shrink is greater than 10%.

For some heat-shrinkable film applications, appearance is important. One appearance criterion that can be used is percent haze. Percent haze can be measured according to ASTM D1003. Preferably, the % haze is less than 25%, more preferably, less than 10%.

Preferably, the film has good stiffness. The modulus (1% secant modulus) can be measured according to ASTM D882. Preferably, the 1% secant modulus, measured in the machine direction (MD), is greater than 45 kpsi., more preferably greater than 60 kpsi.

The following examples merely illustrate the invention. Those skilled in the art will recognize many variations that are within the spirit of the invention and scope of the claims.

Rheological Measurements and Calculations

Rheological measurements are performed in accord with ASTM 4440-95a, which measures dynamic rheology data in the frequency sweep mode. A Rheometrics ARES rheometer is used, operating at 150-190° C., in parallel plate mode under nitrogen to minimize sample oxidation. The gap in the parallel plate geometry is typically 1.2-1.4 mm, the plate diameter is 25 mm or 50 mm, and the strain amplitude is 10-20%. Frequencies range from 0.0251 to 398.1 rad/sec.

ER is determined by the method of Shroff et al., supra (see also U.S. Pat. No. 5,534,472 at col. 10, lines 20-30). Thus, storage modulus (G') and loss modulus (G") are measured. The nine lowest frequency points are used (five points per frequency decade) and a linear equation is fitted by least-squares regression to log G' versus log G". ER is then calculated from:

$$ER = (1.781 \times 10^{-3}) \times G'$$

at a value of G"=5,000 dyn/cm². As a skilled person will recognize, when the lowest G" value is greater than 5,000 dyn/cm², the determination of ER involves extrapolation. The ER values calculated then will depend on the degree of non-linearity in the log G' versus log G" plot. The temperature, plate diameter, and frequency range are selected such that, within the resolution of the rheometer, the lowest G" value is close to or less than 5,000 dyn/cm². The examples below use a temperature of 190° C., a plate diameter of 50 mm, a strain amplitude of 10%, and a frequency range of 0.0251 to 398.1 rad/sec.

Example 1

A three-layer film is prepared by coextrusion on a blown film line using a low-stalk (in the pocket) process and a blow-up ratio (BUR) of 3:1. The film has an overall thickness of 2 mils (50 microns) and the relative thickness of the layers, ABA, is 10:80:10. The core layer (B layer) is a HDPE having an ER=4; an $MI_2$=0.33 dg/min., as measured according to ASTM D1238, Condition 190/2.16; and a density=0.949 g/cm³ measured according to ASTM D-1505-96. The HDPE is available from Equistar Chemicals, LP as Petrothene® LP510300. Each of the skin layers (A layer) is the same and is a blend of 90% by weight of a metallocene-based LLDPE (m-LLDPE) available from Equistar as Petrothene GM1810BA and 10% LDPE having an $MI_2$=0.60 dg/min and a density=0.925 g/cm³, available from Equistar as Petrothene L2560S.

The film modulus (1% secant modulus) is measured in the machine direction according to ASTM D882 to be 100 kpsi. The shrink is measured according to ASTM D2732 to be 5% in the transverse direction. The haze is measured according to ASTM D1003 to be 9.9%.

Example 2

A three-layer film is prepared as in Example 1, but with a core layer of HDPE having an ER=5; an $MI_2$=0.17 dg/min., and a density=0.940 g/cm³ (available from Equistar as Petrothene LP540200). The results are listed in Table 1.

Example 3

A three-layer film is prepared as in Example 2, but with an overall thickness of 2.5 mil (63 microns) and skin layers of LDPE having an $MI_2$=0.4 dg/min., and a density=0.931 g/cm³ (available from Equistar Chemicals as Petrothene L3035X02). The results are listed in Table 1.

Example 4

A three-layer film is prepared as in Example 1, but with a core layer of HDPE having an ER=5.6; an $MI_2$=0.3 dg/min., and a density=0.960 g/cm³ (available from Equistar as Petrothene LB8320). The results are listed in Table 1.

Comparative Example 5

A three-layer film is prepared as in Example 1, but with a core layer of HDPE having an ER=1.9; an $MI_2$=0.95 dg/min., and a density=0.958 g/cm³ (available from Equistar as Alathon® M6210). The results are listed in Table 1.

Comparative Example 6

A three-layer film is prepared as in Example 1, but with a core layer of a blend of 10% by weight of Alathon M6210 HDPE and 90% of Petrothene L2560S LDPE. The results are listed in Table 1.

Comparative Example 7

A three-layer film is prepared as in Example 1, but with a core layer of LDPE having an ER=2.0; an $MI_2$=0.7 dg/min., and a density=0.919 g/cm³ (available from Equistar as Petrothene NA963083). The results are listed in Table 1.

Comparative Example 8

A monolayer film is prepared as in Example 1, but with LDPE having an ER=2.0; an $MI_2$=0.7 dg/min., and a density=0.919 g/cm³ (available from Equistar as Petrothene NA963083). The film has transverse direction shrink: 36%; haze: 13%; machine-direction 1% secant modulus: 24 kpsi.

Examples 1-4 show that a multilayer film comprising LLDPE (Examples 1, 2, and 4) or LDPE skin layers (Example 3) and a core layer of HDPE having an ER greater than 3.0 has good heat-shrink properties in the transverse direction (TD) and high modulus. When the HDPE of the core layer has an ER less than 3, as in Comparative Example 5, the shrink is poor; in Comparative Example 5, the film expands rather than shrinks. Comparative Examples 6 and 7 have less than 80% HDPE in the core layer and they exhibit low modulus. Comparative Example 8 shows that a monolayer film from LDPE also exhibits low modulus.

By using greater than 80% HDPE in the core layer, a high modulus multilayer film is achieved. An $MI_2$ from 0.1 to 1.0 dg/min enables the film to be processed in a coextrusion film line. HDPE with ER greater than 3.0 gives a multilayer film with good heat shrink properties in the transverse direction.

The preceding examples are meant only as illustrations. The following claims define the invention.

TABLE 1

Multilayer Film Compositions and Properties

| Ex # | Skin Layers (%) | | Core Layer | | | | TD Shrink (%) | Haze (%) | MD 1% secant modulus (kpsi) |
|---|---|---|---|---|---|---|---|---|---|
| | m-LLDPE | LDPE | HDPE (%) | LDPE (%) | ER | $MI_2$ | | | |
| 1 | A (90) | B (10) | C (100) | — | 4.0 | 0.33 | 5.0 | 9.9 | 100 |
| 2 | A (90) | B (10) | D (100) | — | 5.0 | 0.17 | 20 | 8.3 | 77 |
| 3 | — | E (100) | D (100) | — | 5.0 | 0.17 | 22 | 11 | 78 |
| 4 | A (90) | B (10) | F (100) | — | 5.6 | 0.3 | 15 | 22 | 148 |
| C5 | A (90) | B (10) | G (100) | — | 1.9 | 0.95 | −4.0 | 24 | 131 |
| C6 | A (90) | B (10) | G (10) | B (90) | — | 0.95 | 14 | 5.3 | 36 |
| C7 | A (90) | B (10) | — | H (100) | — | — | 18 | 4.3 | 29 |

Polyolefins:
A = Petrothene GM1810BA;
B = Petrothene L2560S;
C = Petrothene LP510300;
D = Petrothene LP540200;
E = Petrothene L3035X02;
F = Petrothene LB8320;
G = Alathon M6210;
H = Petrothene NA963083

We claim:

1. A multilayer heat-shrinkable film comprising a core layer and two skin layers wherein each skin layer comprises linear low density polyethylene (LLDPE), low density polyethylene (LDPE), or mixtures thereof and the core layer comprises at least 80% by weight of a high density polyethylene (HDPE) having an ER greater than 3.0, a $MI_2$ from 0.1 to 1.0 dg/min., and a density from 0.940 to 0.970 g/cm³.

2. The film of claim 1 wherein the core layer comprises a blend of the HDPE with up to 20% by weight of a second polyethylene.

3. The film of claim 1 wherein the core layer comprises greater than 95% by weight of HDPE having an ER greater than 3.5.

4. The film of claim 1 wherein each skin layer comprises metallocene-based linear low density polyethylene (m-LLDPE) or a blend of m-LLDPE and low density polyethylene.

5. The film of claim 1 further comprising polymer layers between each of the skin layers and the core layer.

6. The film of claim 1 wherein the core layer has a thickness representing from 25 to 90% of the total thickness of the film.

7. The film of claim 1 wherein the film exhibits a 1% secant modulus in the machine direction of greater than 45 kpsi.

8. The film of claim 1 that exhibits at least 10% shrink in the transverse direction when measured at 135° C. according to ASTM D2732.

* * * * *